United States Patent [19]
Edwards

[11] 3,734,627
[45] May 22, 1973

[54] LASER BORESIGHT KIT AND METHOD OF ALIGNMENT

[75] Inventor: William R. Edwards, California, Md.

[73] Assignee: The United States of America as represented by the Secretary of the Navy, Washington, D.C.

[22] Filed: Nov. 29, 1971

[21] Appl. No.: 202,954

Related U.S. Application Data

[63] Continuation-in-part of Ser. No. 6,097, Jan. 27, 1970, abandoned.

[52] U.S. Cl. ..................356/153, 356/154, 356/172, 33/286
[51] Int. Cl. .............................................G01b 11/26
[58] Field of Search......................356/138, 153, 154, 356/172; 33/286; 89/41 EA, 41 L

[56] References Cited

UNITED STATES PATENTS

| | | | |
|---|---|---|---|
| 3,470,377 | 9/1969 | Le Febre et al. | 356/138 |
| 3,552,859 | 1/1971 | Snyder | 356/153 |
| 2,573,703 | 11/1951 | Gardner | 356/138 |
| 3,612,949 | 10/1971 | Becraft et al. | 356/153 |
| 2,814,125 | 11/1957 | Hartwig | 33/286 |
| 2,393,013 | 1/1946 | Barnes et al. | 356/154 |
| 2,402,856 | 6/1946 | Turrettini | 356/153 |
| 3,452,453 | 7/1969 | Ohlund | 35/25 |

*Primary Examiner*—Ronald L. Wibert
*Assistant Examiner*—Paul K. Godwin
*Attorney*—R. S. Sciascia et al.

[57] ABSTRACT

Apparatus for accurately aligning aircraft guns using a laser. In one instance a laser is mounted in a gun barrel and a laser beam is used to locate a reference point used in determining the adjustments needed in aligning the guns with respect to the gunsight. Another form of the invention uses a pentaprism and a modified pentaprism on a boresight board in conjunction with a laser beam for emitting parallel beams used in sighting in the guns. Another form of the invention is a laser adjustably mounted on a frame and positioned in front of the airplane whose guns are being boresighted, until the frame is perpendicular to the ADL (Armament Datum Line). The laser is correctly positioned on the frame according to boresight data and then the guns are moved to bring the reflected light beam into coincidence with the set position of the laser.

8 Claims, 15 Drawing Figures

PATENTED MAY 22 1973
3,734,627
SHEET 1 OF 4
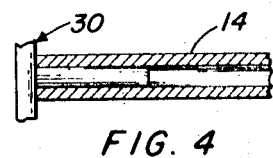
FIG. 4
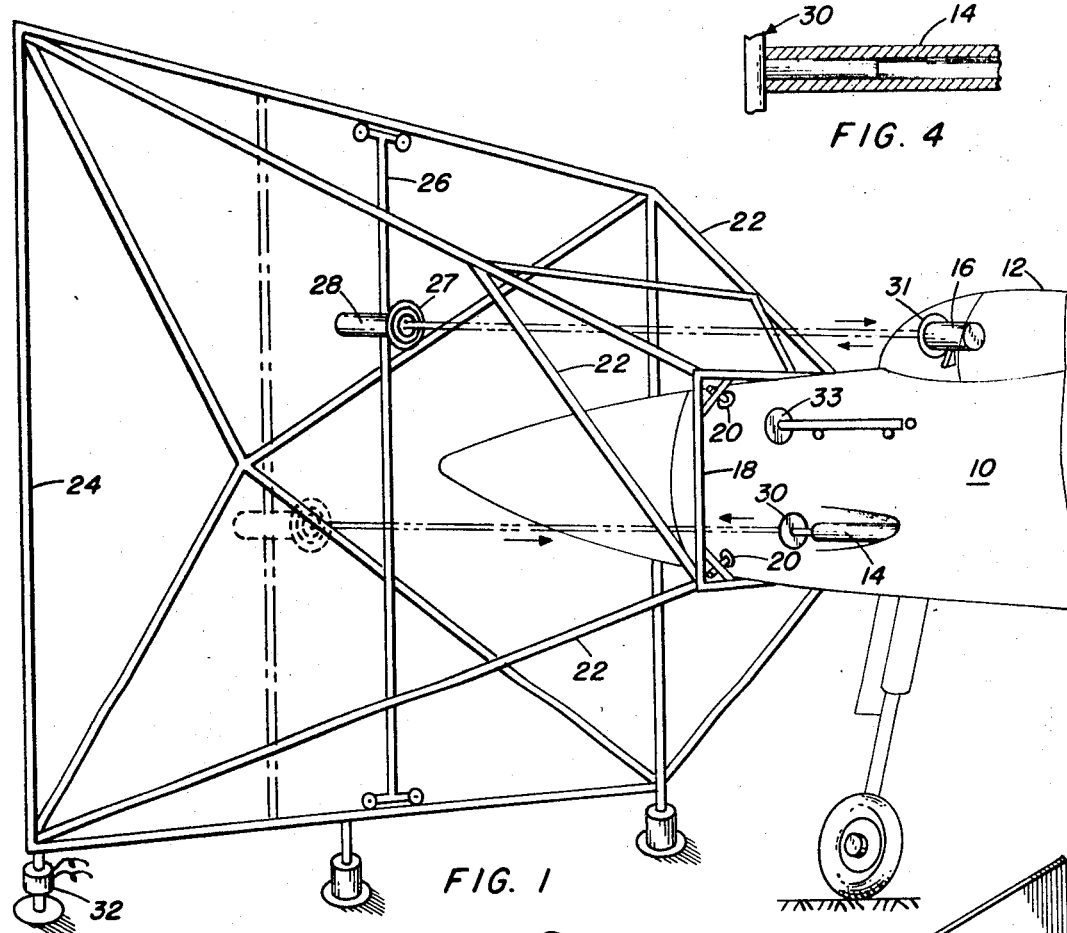
FIG. 1
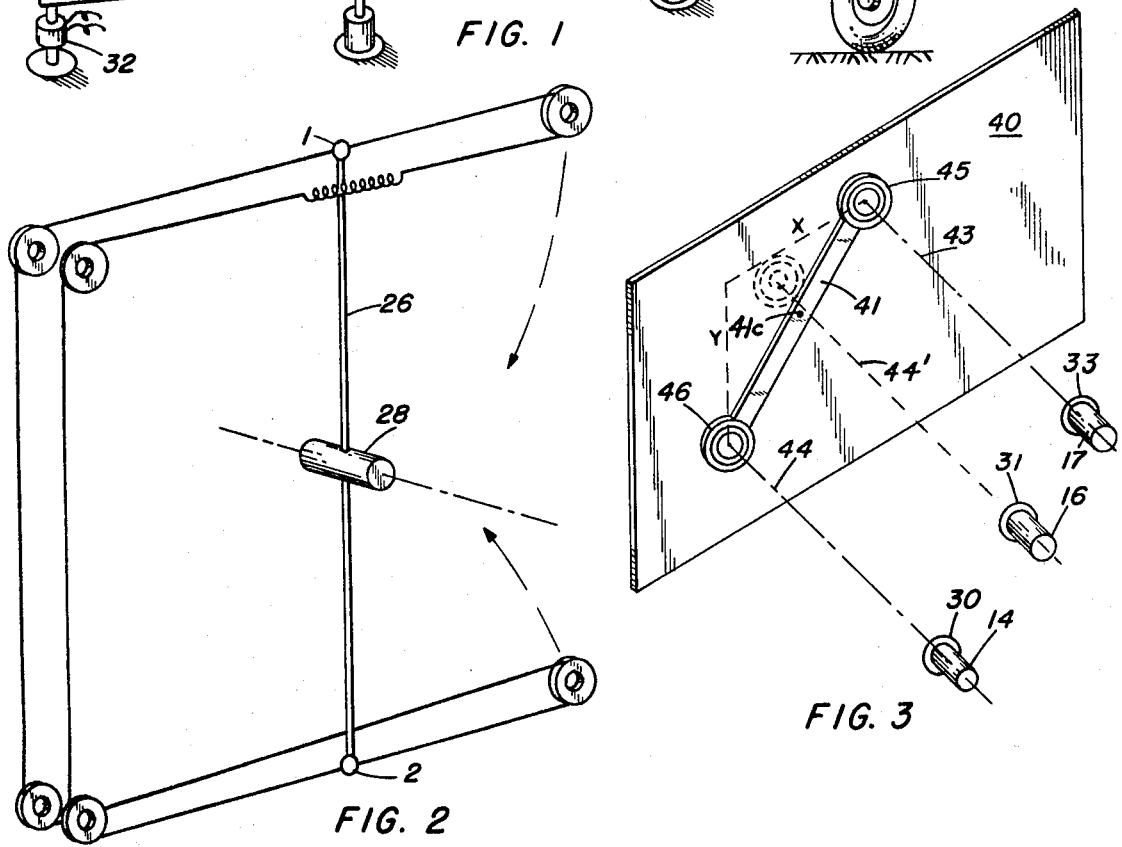
FIG. 2
FIG. 3

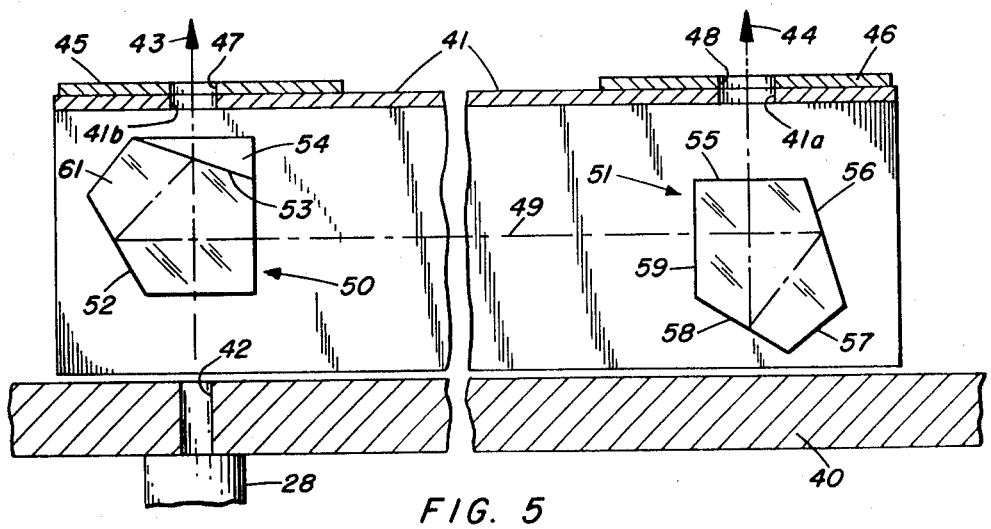
FIG. 5
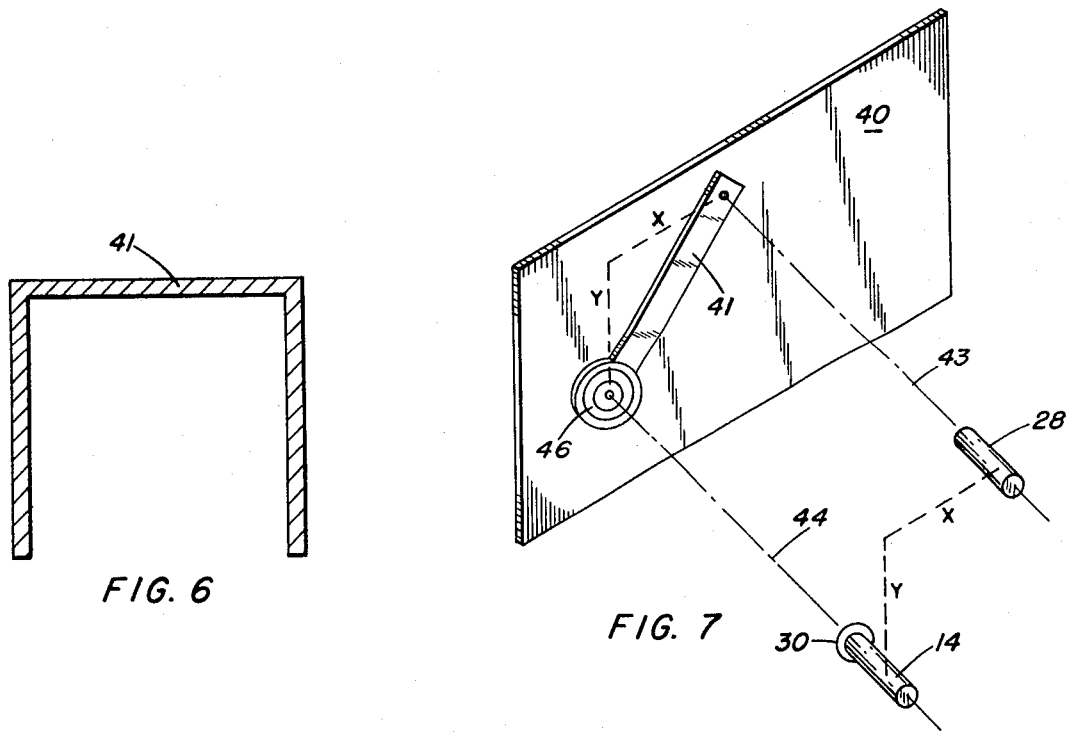
FIG. 6
FIG. 7
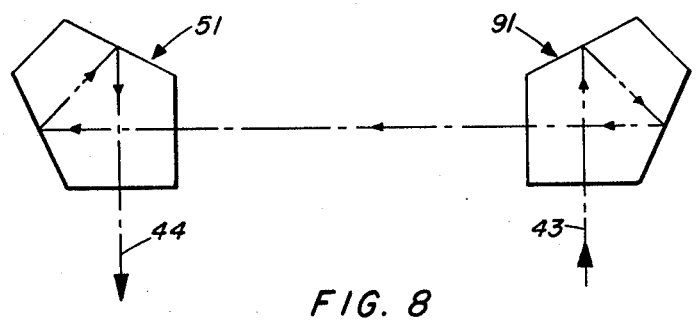
FIG. 8

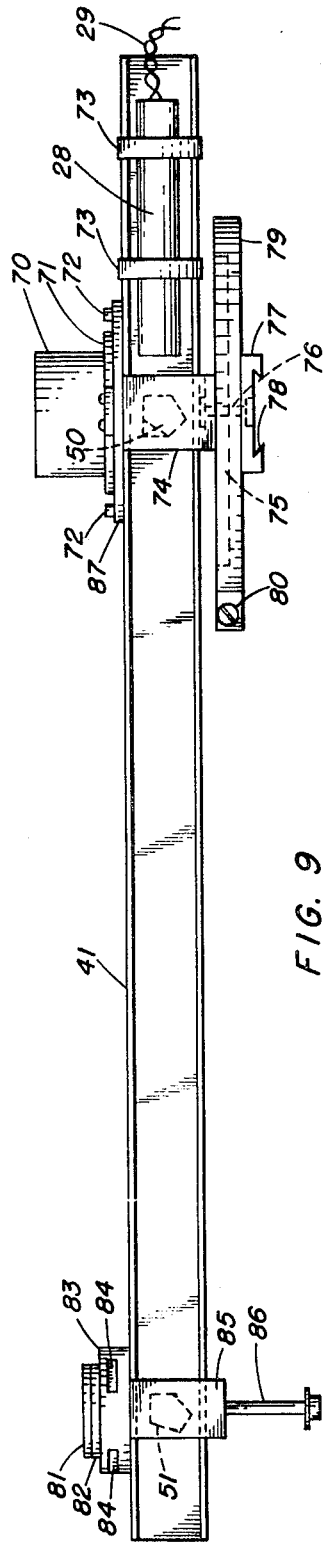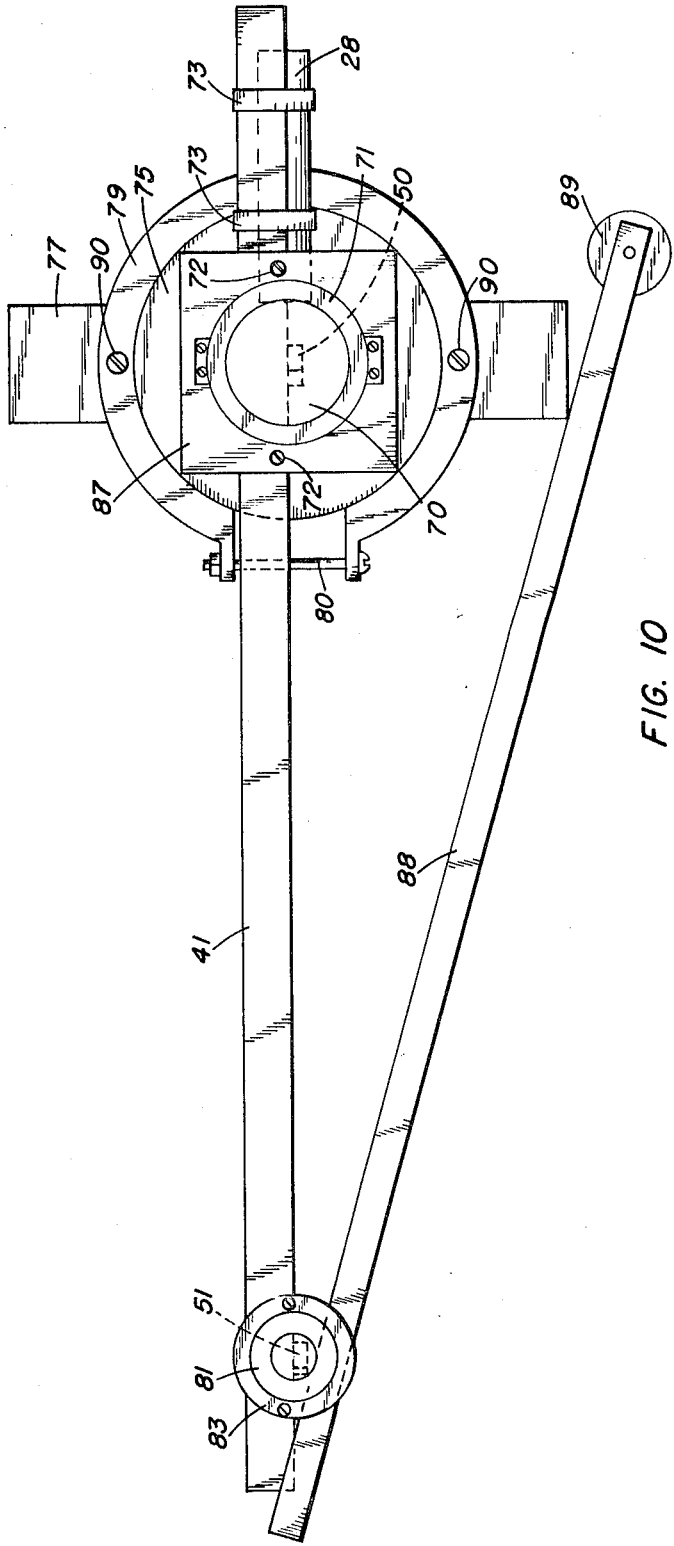

PATENTED MAY 22 1973 3,734,627

LASER BORESIGHT KIT AND METHOD OF ALIGNMENT

CROSS-REFERENCE TO RELATED APPLICATION

This application is a continuation-in-part of application Ser. No. 6,097 filed Jan. 27, 1970 now abandoned.

BACKGROUND OF THE INVENTION

1. Field of the invention

The present invention relates to boresighting kits for aligning the guns on aircraft and more particularly to boresighting kits which employ a laser beam so that accurate alignment within a few seconds of arc are obtainable.

Many devices are known for checking or testing the accuracy of guns and the alignment of their sights so that a gunner is assured of consistently hitting a target at which these guns and sights are pointed. This testing procedure is relatively simple for a hand gun or rifle since the rifle can be securely bolted into a vise which will securely hold the gun from any movement caused by the firing of the ammunition. Then the gun is carefully sighted at a target and fired, due note being taken as to where the bullet hits the target. By this procedure it is possible to tell, when the target is missed in general use of the gun, whether the miss is caused by a malpractice of the gunner himself or a misadjustment in the gun sights.

The procedure for testing the accuracy of guns and sighting equipment installed aboard an aircraft is not as easy. On an aircraft the guns for example are mounted at a location remote from the sighting and firing equipment. Therefore it is not possible to dismantle the gun and install it on a test bench. Furthermore, in present day installations the gunner does not look down the barrel of the gun and optically line up two sights along its barrel with the target, as in the early days.

2. Description of the prior art

Prior art boresighting procedures for an airplane consisted of jacking up or leveling the airplane until the center line of the airframe was horizontal, followed by completely cocking the wheels against any possible movement. Then a boresighting board or target, with a series of concentric rings painted thereon, was located at right angles to the center line of the airframe and positioned a considerable distance away from the airplane but still within range of its guns. Then followed a tedious and long drawn out procedure of actual firing of the guns, noting the deviation from the target, making slight adjustment in the gun mounting, and refiring it again. This procedure required many hours of work and could be performed at only specific stations that had the space and equipment to do the boresighting.

SUMMARY OF THE INVENTION

The present invention provides an improved boresighting technique which has great merit and is a material improvement over the shortcomings of the prior art. The invention takes the form of a boresighting kit which may be useable on land as well as aboard an aircraft carrier, does not require jacking or leveling of the airplane, eliminates the use of a boresight board and consequently the need for a clear area in front of the airplane, and is a kit capable of accurately aligning the weapon systems of the majority of Naval attack and fighter airplanes including the entire weapon systems such as the angle of attack transducers, gyroscopes, radar platforms and armament. In addition to all of these enumerated advantages the kit additionally offers a system which is easy to operate and one which is extremely accurate.

OBJECTS OF THE INVENTION

An object of the present invention is the provision of a laser boresight kit and method of alignment of various weapon systems.

Another object of the present invention is the provision of a laser boresight kit which is useable on land as well as aboard a carrier.

Yet another object of the present invention is the provision of a laser boresight kit which may be used without having to jack up or level the airplane.

Still another object of the present invention is the provision of a laser boresight kit which eliminates the need of a boresight board and the requirement for a large clear area in front of the airplane.

Still another object of the present invention is the provision of a boresight kit which can, accurately within a few hours of time, completely align the entire weapons system of an airplane including angle of attack transducers, gyroscopes, radar platforms, and weapons.

Other objects, advantages and novel features of the invention will become apparent from the following detailed description of the invention when considered in conjunction with the accompanying drawings.

BRIEF DESCRIPTION OF THE DRAWINGS

FIG. 1 shows a schematic view of the boresight kit applied to the nose of a airplane;

FIG. 2 shows a pulley arrangement for shifting the bar 26 in the embodiment of FIG. 1;

FIG. 3 shows another embodiment of the invention;

FIG. 4 shows the manner in which a mirror is mounted in a gun barrel;

FIG. 5 shows the pentaprism arrangement in the embodiment of FIG. 3;

FIG. 6 shows a cross-sectional view of the mounting flange for the pentaprisms in the embodiment of FIGS. 3 and 5;

FIG. 7 shows still another modification of the invention;

FIG. 8 shows the pentaprism arrangement in the embodiment of FIG. 7;

FIG. 9 shows a side view of still another embodiment mounted on a boresight board, or on a frame on the aircraft nose;

FIG. 10 shows a top view of FIG. 9;

DESCRIPTION OF THE PREFERRED EMBODIMENTS

Figure 11:
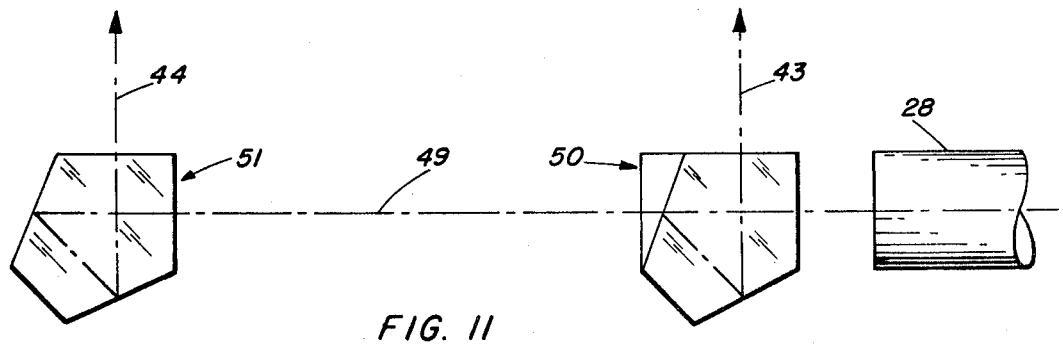
FIG. 11 shows the pentaprism arrangement in the embodiment of FIGS. 9 and 10.
Figure 12:
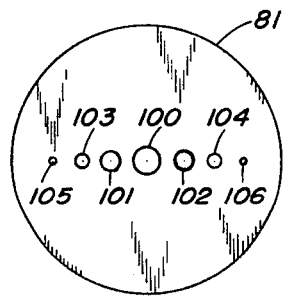
FIG. 12 shows a transparent disc with a ronchi grating pattern thereon.

Referring now to the drawings there is shown in FIG. 1 an airplane 10 having a pilot's compartment 12 and positioned immediately in front of the pilot a gun sight 16 which is to be used in the sighting and firing of a plurality of guns, such as 14, located in the airframe. Mirror 31 is positioned on the gunsight 16 and may be only partially silvered to allow sighting therethrough. Alternatively, it may be a regular mirror removeably mounted or a reflective surface on or in the gunsight 16. Positioned so as to encircle the nose of airplane 10 there is a rectangular framework 18, having in its corners a plurality of set screws 20 diagonally located on the frame 18 so as to securely fasten the frame to the nose of the airplane 10. Extending diagonally out from the frame 18 there are a plurality of struts 22, these struts terminating in the corners of a large square boresight frame 24, the struts 22 being arranged so the plane of boresight frame 24 is at right angles to the center line of the airplane 10 and to the ADL. As an additional support to the boresight frame 24 there are located in each of the two lowermost corners of the frame electrical servos 32; these servos, resting on the ground and being connected with the frame 24 by means of a threaded nut arrangement, can function as a leveling means whereby any thwartwise list to the horizontal arms of the boresight frame 24 can be corrected so that the horizontal members are in fact truly horizontal.

A measuring rod 26 is positioned vertically across the frame work 24 and slidingly mounted at its end to the horizontal arms of the frame as by small rollers. A system of pulleys mounted at the corners of the frame 24 are used to guide a flexible cord attached to the ends of the measuring rod, such as shown in FIG. 2, thereby providing that the measuring rod always moves in a parallel direction since points 1 and 2 of rod 26 are in a fixed relationship with respect to each other.

A laser source 28 is slidably attached to the measuring rod 26, as by some wingnut and friction arrangement, whereby the laser could be moved up and down the measuring rod 26. Fastened to the front end of the laser 28 there is a target 27 having an area in the form of a plurality of circular rings, the laser beam shining through the center of the target toward the airplane as will be described hereinafter. A circular mirror 30 is fastened at right angles to a relatively long extension arm which is inserted into the gun barrel of gun 14 so that the extension extends parallel with the center line of the gun and the mirror 30 has its plane at right angles to the bore of the gun. Mirror 33 is axially aligned with the ADL and the mirrored surface is perpendicular to the ADL to aid in positioning frame 24 perpendicularly with respect to the ADL as will be discussed.

The ADL is parallel to the center line of the aircraft, the center line also being known as the fuselage reference line (FRL) or the fuselage center line.

The operation of the embodiment of FIG. 1 and FIG. 2 will be seen with regard to an airplane 10 which is having the accuracy of its armament checked out. The boresight kit frame 24 is fastened about the nose of the aircraft 10 by means of rectangular brackets 18 and set screws 20, assisted by servos 32 at the bottom of the frame, until the boresight frame is accurately located at right angles to the ADL (Armament Datum Line). This may be done by positioning laser 28 at the proper coordinates with respect to frame 24 and reflecting the beam off mirror 33 on the ADL so that the reflection thereof is properly centered on target 27. It should be noted here that in this situation it is not necessary to jack up or level the plane 10 since boresight frame 24 can be accurately aligned with the airframe even though it is not sitting in a level position. Measurement bar 26 is now moved along the horizontal arms of frame 24 and laser 28 is slid vertically along the measuring bar until the light beam emitted by laser 28, in a direct line, will strike the gun sight 16 located in cockpit 12 of the airplane 10. If the boresight frame 24 is accurately positioned in front of the airplane then light reflected from the gunsight mirror 31 in front of gunsight 16 will fall upon target 27 attached to the front end of the laser, forming a circular spot of light which is slightly larger than that emitted from the laser originally and which will be therefore readily visible. Frame 24 should be adjusted slightly so that this return beam will fall in the center of the target. Alternatively a filter may be used on the gunsight to view the laser beam and line up the beam with the sight 16. After this step has been completed, thereby establishing a plane of reference, without further movement of the boresight frame 24 measurement bar 26 is slid sideways along the horizontal arms of the frame and the laser 28 itself is moved down along the vertical measurement bar 26 so that the laser light can now shine towards gun 14 and fall on mirror 30 which is fastened into the gun barrel. Now, if the barrel of gun 14 is accurately aligned with gunsight 16 then the light from laser 28 will fall upon mirror 30 and be reflected back so as to strike the center of target 27 at it did in the test made on the gun sight. If the gun is out of alignment it may then be adjusted so that the return beam strikes the center of the target 27.

FIG. 3 shows a boresight board 40 having a beam 41 positioned thereon and mounted in such a manner as to pivot about an axis along laser beam 43. Target 45 remains in front of laser 28 at all times and target 46 is moveable as a unit with prism 51 as shown in FIG. 5 along beam 41 and the unit is clamped to the beam 41 at any position desired. This allows it to be moved to many positions on the boresight board 40 and thereby improve the versatility of the device so that it is adaptable to any arrangement of the guns or other systems such as the gyro platform or radar on an aircraft.

FIG. 4 shows the manner in which mirror 30 is mounted in the gun barrel 14. FIG. 5 shows the arrangement of the pentaprisms 50 and 51 in relation to boresight board 40, laser 28, beam 41, and targets 45 and 46. Pentaprisms 50 and 51 may be clamped or held in place in any suitable way, for example as disclosed in parent application Ser. No. 6,097, filed 27 Jan 1970. The pentaprism 50 has been modified by using an ordinary pentaprism 61 but having the surface at 53 only partially silvered and adding optical element 54. Laser beam 43 emitting from laser 28 therefore sends the beam directly through pentaprism 50 and another beam 49 at right angles thereto by reflection from surfaces 53 and 52 as shown in FIG. 5. Beam 49 passes from modified pantaprism 50 on the left as shown in FIG. 5 to common pentaprism 51 shown on the right in FIG. 5 and by reflection from surfaces 56 and 58 forms a beam 44 which is parallel to beam 43. Surfaces 56, 57 and 58 of pentaprism 51 are silvered and surfaces 55 and 59 are unsilvered surfaces. Beam 43 passing through openings 41b and 47 is adjusted to pass along the A.D.L. to impinge on mirror 33 which is mounted perpendicularly along the A.D.L. Mirror 33 is removeably mounted on the A.D.L. telsecope 17 and may be only partially silvered to allow sighting therethrough.

The beam 43 is reflected from mirror 33 and doubles in size when reflected back to target 45. When the return beam on target 45 is exactly centered the device is properly alighed with the A.D.L. Target 46 is then positioned as shown in the dotted lines in FIG. 3 with respect to the A.D.L. and the aircraft fuselage centerline reference point, not shown, on boresight board 40 to correspond with the proper position of the gunsight. Gunsight 16 has mirror 31 positioned in front thereof and mirror 31 is removeably mounted and may be only partially silvered to allow sighting therethrough. The reflected laser beam 44' is centered on target 46 by adjustment of gunsight 16. The gunsight is then properly aligned with respect to the A.D.L. Once this is done, target 46 is located at the same coordinates X and Y as in the proper relationship of the mirror 33 to gun 14. Beam 44 passes through openings 41a and 48 to strike mirror 30, positioned perpendicular to the axis of gun barrel 14. Gun barrel 14 is then adjusted so that the beam returning to strike target 46 is exactly centered on target 46. When both of parallel beams 43 and 44 are reflected back and exactly centered on the their respective targets 45 and 46 then the guns are properly aligned with respect to the A.D.L. A number of openings, like openings 41a, 41b, and 41c may be bored in beam 41 at the most useable positions or a slot may replace the bores so that pentaprism 51 may be used at virtually any position along beam 41.

The embodiment of FIG. 7 and 8 is only slightly different from that of FIGS. 3 – 5. Here, laser 28 is mounted in the A.D.L. telescope mount and projects a beam 43 along the A.D.L. towards the device on boresight board 40. The pentaprism arrangement shown in FIG. 8 is positioned within beam 41 and is moveable along beam 41 and capable of being clamped at any point on beam 41 as a unit with pentaprism 51 or pentaprism 91 as discussed in regard to the other embodiments. Laser beam 44 is produced in the manner shown in FIG. 8 and is parallel to beam 43. Pentaprisms are extremely suitable for this application since they may be rotated out of alignment about 5° and still produce the desired perpendicular reflection therefrom. Beam 44 is reflected back from mirror 30 in gun barrel 14 and when this reflection is centered by adjusting gun 14 on properly positioned target 46 the alignment is complete. A similar adjustment can be made to the gunsight, radar, etc.

The embodiment of FIGS. 9 – 11 is very similar to the embodiment of FIGS. 3 – 6. FIGS. 9 and 10 show an assembly which can be termed a boresight jig. Laser 28 is connected to beam 41 by steel bands 73. Cord 29 goes to a power supply. The device may conveniently be mounted on a boresight board, for example, not shown, which has a cooperating portion received in dove-tail groove 78 of member 77. Member 77 is attached to member 79 by screws 90 and pivotally mounted to members 75 and 74 by bolt 76. Pentaprism 50 is mounted within bracket 74 in any suitable fashion so long as it is positioned in accordance with that arrangement shown in FIG. 11. Upon plate 87 is connected a dial 71 and rotatable portion 70. Rotatable portion 70 is connected to the mounting means, not shown, for pentaprism 50 and rotation of member 70 rotates pentaprism 50. By rotating member 70 and thereby pentaprims 50, reflected laser beam 43 can be lined up to coincide with the A.D.L. by providing a mirror perpendicular to the A.D.L. in the A.D.L. telescope mount as in the manner shown in FIG. 3. If the reflection of laser beam 43 does not coincide with rotatable member 70 which serves as a target in the manner of target 45 in the embodiment of FIG. 5, then repositioning of the apparatus must be made. Once laser beam 43 coincides with the A.D.L., pivot 89 on fuselage reference centerline bar 88 is positioned on the boresight board so that the fuselage reference center-line passes through, and is lined up with the pivot point on pivot 89. The point on the boresight board corresponding to the fuselage reference centerline normally has an opening for reception of the pivot 89, but if necessary, that point may be located on the board in the manner outlined above for locating the A.D.L. point on the boresight board. Unit 83 is slidably mounted on beam 41 and may be secured at any point thereon by set screws, or other suitable clamping means. Pentaprism 51 is mounted within bracket 85 in any suitable fashion so long as it is positioned in accordance with that shown in FIG. 11. This apparatus therefore allows for alignment of any other device used on the aircraft with respect to the fuselage center-line at pivot 89 and the A.D.L., corresponding to laser beam 43 when properly positioned. This is suitable to align any system on an aircraft such as the pilot's reflex gunsight, the guns, the gyro platform, or the heads up display, for example. If aligning the guns with respect to the gunsight, for example, member 83 and thereby pentaprism 51 would be moved to the proper position on bar 41 with respect to the two aforesaid reference points, since rod 88 is slidably received through openings 84 in member 83. A ronchi grating defraction pattern appears on transparent member 81. The series of dots 100–106, are oriented at the proper angle, which would ordinarily be horizontal. Reflected laser beam 44 passes through pilot's sight filter 82 and through transparent member 81 at the center of dot 100 when properly adjusted. The recticle in the gunsight is then aligned with beam 44 and dot 100, and the horizontal line of the reticle is aligned with the line formed by the series of dots 100–106. This complets the alignment and adjustment of the gunsight. Unit 83 and thereby pentaprism 51 is then moved to the position corresponding to one of the guns with respect to the A.D.L., corresponding generally with pivot point 76, and with respect to the fueslage center-line, generally corresponding to the pivot point on pivot 89. By so adjusting, reflected laser beam 44 corresponds to the desired path of the bullets exiting from the gun. Filter 82 and transparent member 81 are not needed for this alignment and may be removed. A mirror 30, not shown but like that shown in FIGS. 3 and 4, is mounted in the gun barrel and beam 44 thereby is reflected to member 83. Member 83 acts as a target in the manner of target 46, shown in FIGS. 3, 5, and 7. The beam is then centered on member 83 by proper adjustment and alignment of the gun. In like fashion, other systems on the aircraft may be aligned as in the alignment of the guns, for example the gyro platform, the radar, or the heads up display.

Figure 13:
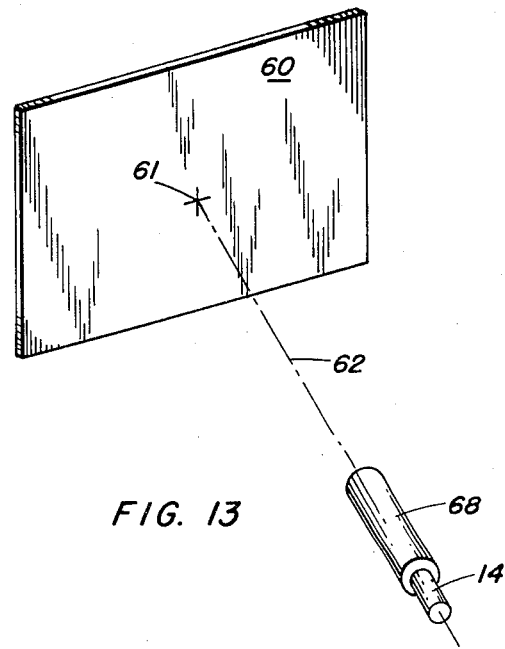
FIG. 13 shows still another modification of the invention.
Figure 14:
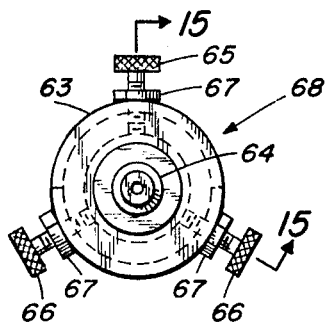
FIG. 14 shows an end view of the apparatus for mounting the laser used in the embodiment of FIG. 13.
Figure 15:
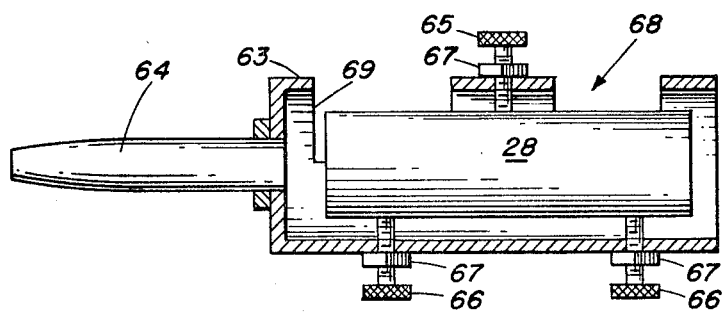
FIG. 15 is a cross-sectional view of FIG. 14 taken along line 15—15.

FIG. 13 schematically shows a direct probe laser 68 mounted in front of and in alignment with gun barrel 14. The construction of the laser and the means mounting it to the gun barrel are best seen in FIGS. 14 and 15. The laser 28 is centered by set screws 65 and 66 passing through casing 63. Although any suitable mounting could be used, the preferred mounting is to have one set screw 65 on top and two sets of two set screws 66 disposed 120° on each side of set screw 65 as shown in FIG. 14. Shaft 64 is preferably slightly tapered and fits into gun barrel 14. The electrical connection to laser 28 passes through an opening in casing 63, not shown, or may pass through opening 69.

In the embodiment of FIGS. 13 – 15 direct probe 68 is inserted in the gun barrel 14 and a beam 62 strikes cloth 60. Direct probe 68 is then rotated 360° about its axis while inserted in the gun barrel 14. If the spot produced by the beam striking cloth 60 moves when the 360° rotation of the laser about the axis of the gun barrel occurs then the laser needs to be adjusted by set screws 65 and 66 until it is aligned to correspond to the axis of the gun barrel and shaft 64. Once this alignment is made, a mark, such as mark 61, is made on cloth 60 where beam 62 strikes the cloth. Sighting is then made through the gunsight of the aircraft, not shown, at mark 61 where laser 62 strikes cloth 63. Laser unit or direct probe 68 is then removed and gun 14 is fired. If the firing of the gun 14 does not strike mark 61, then adjustment of gun 14 is necessary to compensate for the error. This process can be repeated if accuracy is not achieved on the first adjustment.

Obviously many modifications and variations of the present invention are possible in light of the above teachings. It is therefore to be understood that, within the scope of the appended claims, the invention may be practiced otherwise than as specifically described.

What is claimed is:

1. A boresight kit for accurately aligning components of a weapon system on an airplane comprising:
   means for establishing a plane of reference in front of the airplane at right angles to its armament datum line comprising a rectangular frame, having horizontal and vertical members, which is attached to the nose of the airplane;
   a source of laser light mounted so as to direct the emitted laser light beam perpendicular to the reference plane;
   means attached to a component of the weapon system for reflecting the laser light to thereby enable alignment of said component; and
   a target for receiving the reflected light.

2. The device of claim 1 wherein the rectangular frame has a measuring bar positioned vertically across the frame and mounted to roll along the horizontal members of the frame.

3. The device of claim 2 wherein the source of laser light is slidably mounted on the measuring bar.

4. A boresighting apparatus comprising:
   a boresight board positioned perpendicularly with respect to an aircraft fuselage centerline;
   a laser source means for producing a first beam of light directed towards a beamsplitter means mounted on said boresight board at a point corresponding to a reference line parallel to or coincident with said aircraft fuselage centerline;
   a pentaprism means adjustably mounted on said boresight board and having a position corresponding to the axis of a properly positioned gun barrel mounted on said aircraft,
   said beamsplitter means emitting second and third beams of light which are perpendicular with respect to one another;
   means for aligning said third beam of light to correspond to said reference line,
   said second beam of light being directed to said pentaprism means which converts said second beam of light into a fourth beam of light which is parallel to said third beam of light, wherein said fourth beam of light corresponds to the axis of said properly positioned gun barrel such that gun barrel alignment may be checked or adjusted.

5. The device of claim 4 wherein said beamsplitter is of a pentaprism configuration.

6. A boresight jig comprising:
   a base member adapted to be rotatably mounted about and perpendicular to a line parallel to or coincident with an aircraft fuselage centerline;
   first pentaprism means mounted on the pivotal axis of said base member for receiving a first beam of light from a laser source and emitting a secon beam of light perpendicular thereto; and
   second pentaprism means mounted on said base member for receiving said second beam of light and emitting a third beam of light perpendicular thereto, wherein two of said beams of light form respectively parallel reference lines so that aircraft equipment may be properly aligned with respect thereto.

7. The boresighting jig of claim 6 wherein said laser source is mounted on said base member.

8. The boresighting jig of claim 6 wherein said first pentaprism is a beamsplitter.

* * * * *